April 28, 1936.  R. MARKLEY, JR  2,039,235
MILK COOLING APPARATUS
Filed Nov. 8, 1934
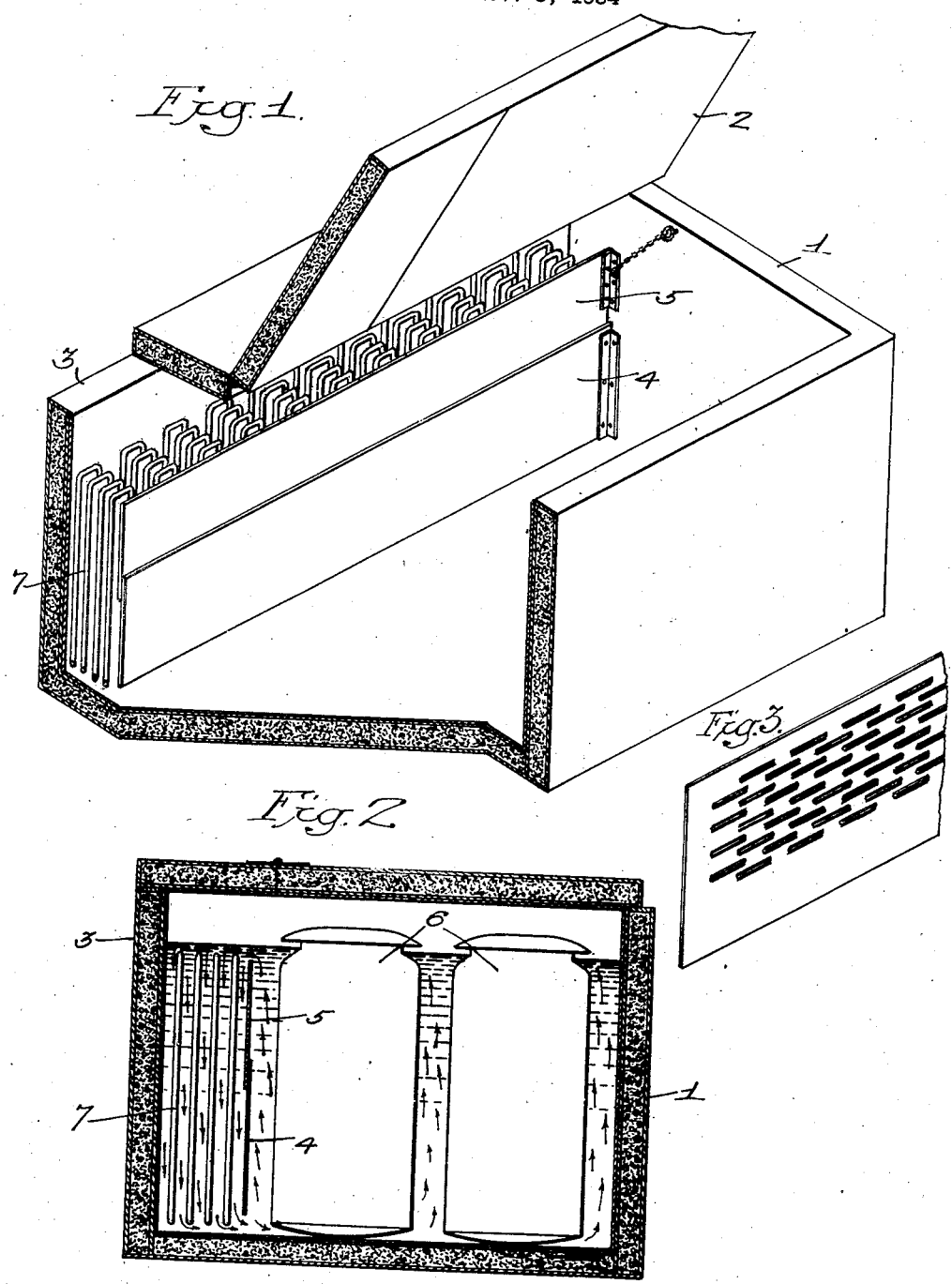

Patented Apr. 28, 1936

2,039,235

UNITED STATES PATENT OFFICE 2,039,235

MILK COOLING APPARATUS

Richard Markley, Jr., Malvern, Pa.

Application November 8, 1934, Serial No. 752,161

3 Claims. (Cl. 62—101)

This invention relates to improvements in milk cooling apparatus.

It has been found that milk cooled rapidly and immediately after being taken from the cow to a temperature below 50° F. has materially less tendency to spoil than milk subjected to a slow cooling process. Apparatus in the form of water tanks or cabinets provided with immersed cooling or refrigerating coils have been evolved for this purpose, but due to their relatively high cost of manufacture and to certain inherent faults of construction they have never been highly practicable or satisfactory.

One of the faults common to the prior devices has been the tendency of the water in which the milk containers are immersed to stratify, so that while a portion of the milk in the containers may be brought with reasonable rapidity to the desired low temperature, the remainder of the milk is cooled very slowly and frequently to an inadequate degree. Such apparatus also has been relatively expensive to operate by reason of the necessity for continued operation over relatively long periods of time in order to bring all of the milk in the containers to a reasonably low temperature.

Another fault of the prior devices has been a tendency of the coils to freeze up, which interferes with the operating efficiency and made necessary the use of relatively high refrigerating temperatures, and consequently the cooling operation was a relatively slow one, and, therefore, relatively ineffective for the desired purpose.

Still another undesirable feature of the prior apparatus arising from the aforesaid tendency of the water to stratify has been the necessity for use of pumps to effect an agitation of the water in the tank. This requirement increased the initial cost of the apparatus and also the costs of operation and maintenance.

Still another undesirable feature of the prior devices has been their comparative bulkiness and the fact that they were not readily or economically packed for shipment.

A principal object of the invention is to provide cooling apparatus for the stated purpose which shall largely overcome the recognized faults of the prior devices as set forth above, that shall be relatively simple in form and inexpensive to manufacture, and that shall have a relatively high operating efficiency.

In the attached drawing:

Figure 1 is a sectional perspective view of a cabinet made in accordance with my invention;

Fig. 2 is a transverse sectional view, and

Fig. 3 is a fragmentary perspective view illustrating a modification within the scope of the invention.

With reference to the drawing, the cabinet therein disclosed and constituting a preferred embodiment of my invention comprises a cabinet or tank 1 which may be made of suitable material and preferably one having relatively high insulating properties. In the present instance, the cabinet 1 is provided with a cover or lid 2 hinged to the body of the cabinet as illustrated. Adjacent the rear wall 3 of the cabinet is a baffle, which in the illustrated embodiment comprises a relatively fixed lower section 4 and a vertically adjustable upper section 5. As shown in Fig. 2, the lower edge of the baffle section 4 is elevated above the floor of the cabinet, and the construction provides for adjustment of the upper section 5 of the baffle into a position wherein the upper edge thereof lies below the level of the water in the cabinet, as also shown in Fig. 2. Since the level of the water in the cabinet may depend in part upon the number of milk containers 6 occupying the cabinet at any time, it is apparent that the adjustable baffle affords a simple and effective means for adapting the apparatus to the cooling of varying quantities of milk. Intermediate the baffle 4—5 and the rear wall 3 of the cabinet is a refrigerating coil 7, which coil in practice is connected to a suitable circulating refrigerating system (not shown). The coil 7 is so constructed that the major portion thereof extends in the vertical direction, the transverse sections of the coil being reduced to a minimum.

In operation, the milk containers 6 are placed in the cabinet and are substantially immersed in the water. The refrigerating medium is circulated through the coil 7 in well known manner, with the result that the body of water surrounding the coils and confined between the baffle and the rear wall 3 of the cabinet is rapidly cooled and has a tendency to move downwardly by convection toward the bottom of the baffle. This downward movement of the cooled water has the effect of drawing the relatively warm water at the upper levels over the top of the baffle section 5, so that a circulation is set up within the cabinet, as indicated by the arrows in Fig. 2.

It will be apparent that the arrangement precludes the possibility of stratification of the water in the cabinet, and will rapidly and efficiently reduce the temperature of the entire body of water to a desirable low temperature. I have found that by use in this type of apparatus of upright coils, the tendency for the coils to become coated with ice is materially less than with coils arranged in the transverse direction, this being due to the almost complete absence of "dead" spots within the area embracing the coils and the fact that substantially the entire mass of water within the coil area and confined by the baffle 4—5 is normally in movement downwardly over and in the direction of the coils, with a consequent wiping action effectively preventing ice formation. In the case of a horizontal coil in which the major portion extends transversely to the direction in which the water circulates, there is unavoidably an extensive eddy current formation at the under sides of the horizontal tubing with the development of the aforesaid dead spots in which the ice formations tend to initiate. In a horizontal coil also, the liquid refrigerant tends to flow at the bottom of the horizontal tubing, thereby contacting a relatively small portion of the total circumferential area, whereas in a coil such as the applicant's, wherein the major portion extends in the substantially vertical direction, the liquid refrigerant necessarily comes into contact with substantially the entire circumferential area of the tubing. In the vertical arrangement, therefore, there is a greater effective evaporation of the refrigerant with a consequent increase in refrigerating efficiency. By reason of these characteristics of the vertical construction, I have found it possible to employ relatively low refrigerating temperatures without icing, so that the cooling of the entire body of water within the cabinet is a relatively rapid one, with a corresponding rapid dissipation of heat from the milk within the container 6. Not only is the cooling of the milk in my apparatus relatively rapid, but the entire body of milk within the individual containers is cooled at a substantially uniform rate. By reason of the effective circulation of the water within the cabinet set up as described above and the resulting absence of any tendency toward stratification, there is in my apparatus no necessity for effecting agitation of the water in the cabinet by external means such as pumps. The apparatus, therefore, is relatively inexpensive both in initial cost and in operation.

The compact vertical coil located entirely at the back of the cabinet interferes in no way with the insertion and withdrawal of the containers 6 into and from the cabinet, and is of a form readily packed for shipment. This coil and the construction generally is well adapted for cabinets of the knock-down type that may be disassembled for shipment and readily set up in any desired location at the place of use.

It will be understood that there may be modifications in the aforedescribed apparatus without departure from the invention as defined in the attached claims. I may for example replace the adjustable baffle 4—5 with a baffle of the form illustrated in Fig. 3, this baffle being fixed in the cabinet and having in its upper portion apertures accommodating different levels of water in the cabinet and permitting circulation of the water as described above.

I claim:

1. In milk cooling apparatus, the combination with a water tank having a compartment for reception of milk containers for immersion in said water and an adjoining compartment of limited capacity, a baffle separating said compartments and constructed and arranged to permit free flow of water between the compartments both at top and bottom and over substantially the entire length of said baffle, and cooling apparatus operatively associated with said tank and comprising an expansion coil closely confined in said adjoining compartment, the major portion of the tubing constituting said coil extending vertically in said compartment, and said coil being constructed and arranged to reduce to a minimum the transversely extending portions of said coil.

2. In milk cooling apparatus, the combination with a water tank having a baffle adjacent a side wall thereof and defining one side of a main compartment for reception of milk containers for immersion in said water, said baffle being constructed and arranged to permit free flow of water to or from said main compartment at both top and bottom, and a cooling coil confined between said baffle and the adjacent wall of said tank and consisting of a plurality of elongated upright convolutions, said coil being constructed and arranged to reduce to a minimum the transversely extending portions.

3. In milk cooling apparatus, the combination with a water tank having a compartment for reception of milk containers for immersion in said water and an adjoining compartment of limited capacity, a baffle separating said compartments and comprising a lower relatively fixed section mounted in said tank with its lower edge above the bottom surface of the tank, said baffle comprising also an upper section vertically adjustable to regulate the effective height of said baffle to permit free flow of water between the compartments over the upper edge of the baffle, and a cooling coil closely confined in said adjoining compartment.

RICHARD MARKLEY, Jr.